US012073961B2

(12) United States Patent
Zhang et al.

(10) Patent No.: US 12,073,961 B2
(45) Date of Patent: Aug. 27, 2024

(54) POLYPROPYLENE CABLE PROTECTIVE LAYER AND PREPARATION METHOD THEREOF

(71) Applicant: ELECTRIC POWER RESEARCH INSTITUTE. CHINA SOUTHERN POWER GRID, Guangdong (CN)

(72) Inventors: Yifan Zhang, Guangdong (CN); Mingli Fu, Guangdong (CN); Shuai Hou, Guangdong (CN); Xiaolin Li, Guangdong (CN); Lei Jia, Guangdong (CN); Baojun Hui, Guangdong (CN); Bin Feng, Guangdong (CN); Wenbo Zhu, Guangdong (CN); Yunpeng Zhan, Guangdong (CN); Yongjie Nie, Guangdong (CN)

(73) Assignee: ELECTRIC POWER RESEARCH INSTITUTE. CHINA SOUTHERN POWER GRID, Guangdong (CN)

( * ) Notice: Subject to any disclaimer, the term of this patent is extended or adjusted under 35 U.S.C. 154(b) by 0 days.

(21) Appl. No.: 17/920,051

(22) PCT Filed: Sep. 18, 2021

(86) PCT No.: PCT/CN2021/119222

§ 371 (c)(1),
(2) Date: Oct. 20, 2022

(87) PCT Pub. No.: WO2023/029115

PCT Pub. Date: Mar. 9, 2023

(65) Prior Publication Data

US 2024/0221971 A1 Jul. 4, 2024

(30) Foreign Application Priority Data

Sep. 1, 2021 (CN) ........................ 202111023507.5

(51) Int. Cl.
*H01B 3/44* (2006.01)
*H01B 7/02* (2006.01)

(52) U.S. Cl.
CPC ........... *H01B 3/441* (2013.01); *H01B 7/0225* (2013.01); *H01B 7/0291* (2013.01)

(58) Field of Classification Search
None
See application file for complete search history.

(56) References Cited

U.S. PATENT DOCUMENTS

2015/0243409 A1* 8/2015 Gronowski ........... H01F 27/288 427/118
2015/0243410 A1* 8/2015 Knerr ....................... H02K 3/32 310/198

(Continued)

FOREIGN PATENT DOCUMENTS

CN 105400068 A 3/2016
CN 105924767 A 9/2016

(Continued)

OTHER PUBLICATIONS

International Search Report for PCT/CN2021/119222 mailed May 27, 2022, ISA/CN.

*Primary Examiner* — Krystal Robinson
(74) *Attorney, Agent, or Firm* — Yue (Robert) Xu; Apex Attorneys at Law, LLP

(57) ABSTRACT

The present invention provides a polypropylene cable protective layer and a preparation method thereof. The polypropylene cable protective layer sequentially includes a dielectric layer, a buffer layer and an insulating layer from the inside to the outside, and the thickness of the dielectric layer accounts for 5%~12% of the thickness of the polypropylene cable protective layer; the thickness of the buffer layer accounts for 17%~25% of the thickness of the polypropylene cable protective layer; the dielectric layer, the (Continued)

buffer layer and the insulating layer are respectively obtained by the wrapping of a polypropylene film A, a polypropylene film B and a polypropylene film C. The polypropylene cable protective layer of the present invention forms a dielectric gradient, and realizes the improvement of the insulation strength and voltage level of the power cable, and the increase of the transmission capability.

9 Claims, 2 Drawing Sheets

(56) References Cited

U.S. PATENT DOCUMENTS

| | | | | |
|---|---|---|---|---|
| 2016/0217888 | A1* | 7/2016 | Xiang | H01B 13/06 |
| 2016/0251506 | A1 | 9/2016 | Kong et al. | |
| 2020/0219637 | A1 | 7/2020 | Ahn et al. | |

FOREIGN PATENT DOCUMENTS

| | | | |
|---|---|---|---|
| CN | 110265176 | A | 9/2019 |
| CN | 111171449 | A | 5/2020 |
| CN | 111292885 | A | 6/2020 |

* cited by examiner

POLYPROPYLENE CABLE PROTECTIVE LAYER AND PREPARATION METHOD THEREOF

This application is the national phase of International Application No. PCT/CN2021/119222, titled "POLYPROPYLENE CABLE PROTECTIVE LAYER AND PREPARATION METHOD THEREOF", filed on Sep. 18, 2021, which claims the priority to Chinese Patent Application No. 202111023507.5, titled "POLYPROPYLENE CABLE PROTECTIVE LAYER AND PREPARATION METHOD THEREOF", filed on Sep. 1, 2021 with the China National Intellectual Property Administration, which is incorporated herein by reference in entirety.

FIELD

The present disclosure relates to the technical field of cable materials, and in particular to a polypropylene cable protective layer and a preparation method thereof.

BACKGROUND

As an important carrier of power transmission, power cables are widely used in power systems. With the continuous development of the national economy and the continuous emergence of decentralized renewable energy centers, long-distance and large-capacity transmission of electric energy has become the main trend of power system development. At present, the voltage level of power cables generally does not exceed 550 kV, and the improvement of the transmission capacity is also limited. Therefore, there is an urgent need to develop and manufacture power cables with higher voltage levels.

In the prior art, increasing the voltage level of the cable is generally achieved by increasing the radial thickness of the insulating layer. However, increasing the thickness of the insulating layer tends to significantly increase the diameter of the cable. On the one hand, it will reduce the toughness of the cable, which is not conducive to the bending of the cable, thereby increasing the difficulty of construction during the cable laying process; on the other hand, the insulating layer, whose thickness is too high and thermal conductivity is poor, is also not conducive to the dissipation of Joule heat in the center conductor, which will increase the temperature rise of the cable and reduce the operating life of the conductor and insulating material. Therefore, how to improve the insulation strength and voltage level of the power cable and increase the transmission capability without reducing the mechanical toughness and heat dissipation capacity of the power cable has become an urgent problem to be solved in the power cable manufacturing.

SUMMARY

The purpose of the present invention is to overcome the shortcomings of the prior art and provide a polypropylene cable protective layer and a preparation method thereof.

In order to achieve the above purpose, the technical solution adopted in the present invention is: a polypropylene cable protective layer, wherein the polypropylene cable protective layer sequentially comprises a dielectric layer, a buffer layer and an insulating layer from the inside to the outside. The thickness of the dielectric layer accounts for 5%~12% of the thickness of the polypropylene cable protective layer; the thickness of the buffer layer accounts for 17%~25% of the thickness of the polypropylene cable protective layer; the dielectric layer is obtained by the wrapping of a polypropylene film A, and the buffer layer is obtained by the wrapping of a polypropylene film B, and the insulating layer is obtained by the wrapping of a polypropylene film C;

The polypropylene film A comprises the following components in parts by weight: 100 parts of polypropylene, 8~10 parts of graphene oxide and 0.5~5 parts of maleic anhydride grafted polypropylene, and the thickness of the polypropylene film A is 0.05~0.2 mm;

the polypropylene film B comprises the following components in parts by weight: 100 parts of polypropylene, 4~6 parts of graphene oxide and 0.5~5 parts of maleic anhydride grafted polypropylene, and the thickness of the polypropylene film B is 0.05~0.2 mm;

the polypropylene film C comprises the following components in parts by weight: 100 parts of polypropylene and 0.5~5 parts of maleic anhydride grafted polypropylene, and the thickness of the polypropylene film C is 0.05~0.2 mm.

The above-mentioned polypropylene cable protective layer is composed of a dielectric layer, a buffer layer and an insulating layer. The dielectric layer, the buffer layer and the insulating layer are respectively obtained by the wrapping of polypropylene films whose graphite oxide content gradually decreases, so that the polypropylene cable protective layer forms a dielectric gradient, which can greatly improve the dielectric strength of the cable and significantly reduce the thickness of the insulating layer to achieve a balance between the dielectric strength, mechanical toughness and thermal conductivity of the power cable, and realize the improvement of the insulation strength and voltage level of the power cable, and the increase of the transmission capability without reducing the mechanical toughness and heat dissipation capacity of the power cable. The problems of uneven mixing and filler agglomeration often occur in the existing dielectric gradient insulation components, which will lead to the rupture of film due to the occurrence of local stress concentration during the processing, and insulation failure in the agglomeration area of fillers in the cable. The above polypropylene cable protective layer is obtained by the wrapping of polypropylene films with different dielectric parameters, which effectively avoids the problems of uneven mixing and filler agglomeration. The polypropylene film contains maleic anhydride grafted polypropylene (PP-g-MAH), which acts as a surface modifier for graphene and becomes a bridge to improve the adhesion and compatibility between graphene oxide and polypropylene molecules (it improves the adhesion and compatibility between graphene oxide and polypropylene particles), thereby reducing the dispersion of permittivity and electrical conductivity, improving the breakdown field strength, and improving the stability of dielectric gradient cables. The above-mentioned polypropylene cable protective layer defines the thickness ratio of the dielectric layer, the buffer layer and the insulating layer, and defines the thickness of the polypropylene film A, the polypropylene film B and the polypropylene film C, which is conducive to improving the toughness of the polypropylene cable, and enhancing the dielectric strength.

Preferably, the thickness of the polypropylene film A is 0.08~0.15 mm; the thickness of the polypropylene film B is 0.08~0.15 mm; and the thickness of the polypropylene film C is 0.08~0.15 mm.

Preferably, the thickness of the dielectric layer accounts for 8%~10% of the thickness of the polypropylene cable protective layer; the thickness of the buffer layer accounts for 17%~20% of the thickness of the polypropylene cable protective layer.

The inventors of the present invention found through research that when the thickness of the dielectric layer accounts for 8%~10% of the thickness of the polypropylene cable protective layer and when the thickness of the buffer layer accounts for 17%~20% of the thickness of the polypropylene cable protective layer, it is more beneficial to improve the dielectric strength and mechanical toughness of the polypropylene cable protective layer.

Preferably, the polypropylene cable protective layer is formed by hot pressing at 160° C.~180° C.

The bubbles between the polypropylene films of the polypropylene cable protective layer are removed by hot pressing at 160° C.~180° C., which is beneficial to improve the uniformity of the structure of the polypropylene cable protective layer.

Preferably, the polypropylene film A comprises the following components in parts by weight: 100 parts of polypropylene, 9~10 parts of graphene oxide and 1~5 parts of maleic anhydride grafted polypropylene;

the polypropylene film B comprises the following components in parts by weight: 100 parts of polypropylene, 5~6 parts of graphene oxide and 1~5 parts of maleic anhydride grafted polypropylene;

the polypropylene film C comprises the following components in parts by weight: 100 parts of polypropylene and 1~5 parts of maleic anhydride grafted polypropylene.

Preferably, the melt index of the polypropylene at 200° C. is 2~3 g/10 min.

Preferably, the relative permittivity of the polypropylene film A is 30~35, the electrical conductivity is $(0.8\sim1.2)10^{-8}$ S/m, and the thermal conductivity is 0.7~0.9 W/m·K;

the relative permittivity of the polypropylene film B is 10~12, the electrical conductivity is $(0.8\sim1.2)10^{-12}$ S/m, and the thermal conductivity is 0.4~0.6 W/m·K;

the relative permittivity of the polypropylene film C is 2.2~2.5, the electrical conductivity is $(0.8\sim1.2)\ 10^{-14}$ S/m, and the thermal conductivity is 0.2~0.3 W/m·K.

The present invention also provides a cable, which sequentially includes a conductor, any one of the above-mentioned polypropylene cable protective layers and an outer insulation screen layer from the inside to the outside.

The above-mentioned cable adopts any one of the polypropylene cable protective layers described above, which can enhance the dielectric strength of the cable, and significantly reduce the thickness of the polypropylene cable protective layer, so as to achieve a balance between the dielectric strength, mechanical toughness and thermal conductivity of the power cable.

The present invention also provides a method for preparing any one of the above-mentioned polypropylene cable protective layers, the method comprising the following steps:

(1) wrapping the polypropylene film A as a dielectric layer;

(2) wrapping the polypropylene film B along the dielectric layer to obtain a buffer layer;

(3) wrapping the polypropylene film C along the buffer layer to obtain an insulating layer;

(4) hot pressing forming at 160° C.~180° C., wherein the hot pressing direction of hot pressing forming includes several hot pressing directions that are centrosymmetric and perpendicular to the circumference of the polypropylene cable protective layer, and the pressure deviation of several hot pressing directions does not exceed 2%.

More preferably, in the step (4), the pressures in several hot pressing directions are equal.

The above method adopts the hot isostatic pressing method to form the cable protective layer by hot pressing, and the pressures in all directions are equal, which can improve the structural uniformity of the cable protective layer during the hot pressing forming process.

Preferably, in the step (4), a step-by-step pressurization method is adopted in the hot pressing forming.

Preferably, the step-by-step pressurization method in the hot pressing forming comprises the following steps: maintaining the temperature of the polypropylene cable protective layer at 160~180° C.;

(a) applying pressure at 5 MPa for 2 min;

(b) removing pressure and waiting for 20 s;

(c) applying pressure at 10 MPa for 2 min;

(d) removing the pressure and waiting for 20 s;

(e) applying pressure at 15 MPa for 20 min;

(f) after removing the pressure, reducing the temperature to 120° C. and stabilizing for 60 minutes;

(g) slowly reducing to room temperature at a rate of 10° C./min to obtain the polypropylene cable protective layer.

The beneficial effects of the present invention are as follows: the present invention provides a polypropylene cable protective layer and a preparation method thereof. The polypropylene cable protective layer of the present invention has the following advantages: (1) it is composed of a dielectric layer, a buffer layer and an insulating layer; the dielectric layer, the buffer layer and the insulating layer are respectively obtained by the wrapping of the polypropylene films with gradually decreasing graphite oxide content, so that the polypropylene cable protective layer forms a dielectric gradient, which can greatly improve the dielectric strength of the cable and significantly reduce the thickness of the insulating layer, achieving a balance between the dielectric strength, mechanical toughness and thermal conductivity of the power cable, and realizing the improvement of the insulation strength, voltage level of the power cable and the increase of transmission capability without reducing the mechanical toughness and heat dissipation capacity of the power cable; (2) the problems of uneven mixing and filler agglomeration often occur in the existing dielectric gradient insulation components, which will lead to the rupture of the film due to the local stress concentration during processing, and the insulation failure in the agglomeration area of the filler in the cable. The above polypropylene cable protective layer is obtained by the wrapping of polypropylene films with different dielectric parameters, which effectively avoids the problems of uneven mixing and filler agglomeration. The polypropylene film contains maleic anhydride grafted polypropylene (PP-g-MAH), which acts a surface modifier of graphene, and becomes a bridge to improve the adhesion and compatibility between graphene oxide and polypropylene molecules (it improves the adhesion and compatibility between graphene oxide and polypropylene particles), thereby reducing the dispersion of permittivity and electrical conductivity, improving the breakdown field strength, and improving the stability of dielectric gradient cables; (3) the polypropylene cable protective layer of the present invention defines the thickness ratio of the dielectric layer, the buffer layer and the insulating layer, and defines the thickness of the polypropylene film A, the polypropylene film B and the polypropylene film C, which is beneficial to improve the toughness of the polypropylene cable and enhance the dielectric strength.

Figure 1:
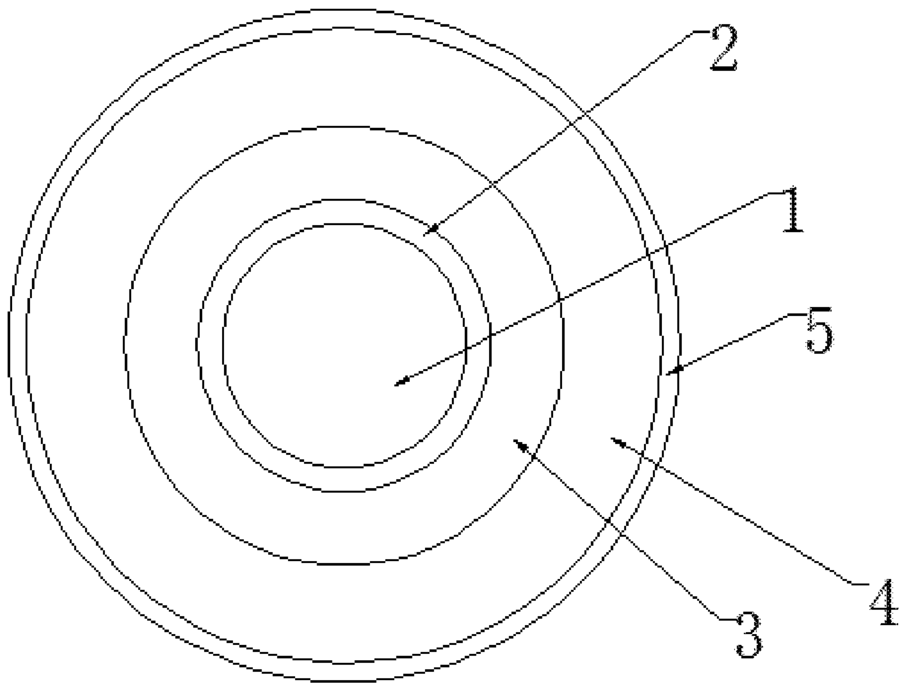
FIG. 1 is a front cross-sectional view of a cable according to an embodiment of the present invention.
Figure 2:
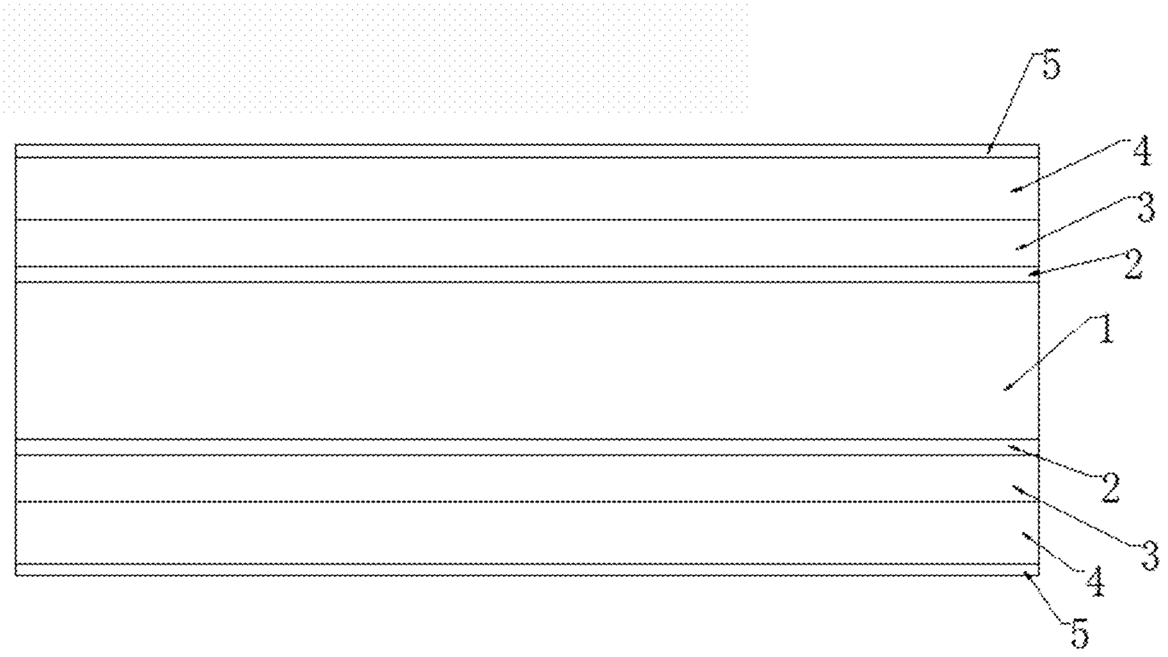
FIG. 2 is a side cross-sectional view of a cable according to an embodiment of the present invention.

1. Center conductor; 2. Dielectric layer; 3. Buffer layer; 4. Insulating layer; 5. Outer insulation screen layer.

DETAILED DESCRIPTION OF EMBODIMENTS

In order to better illustrate the purpose, technical solutions and advantages of the present invention, the present invention will be further described below with reference to specific embodiments.

Example 1

As a polypropylene cable protective layer of an example of the present invention, the polypropylene cable protective layer was sequentially composed of a dielectric layer, a buffer layer and an insulating layer from the inside to the outside, and the thickness of the dielectric layer accounted for 10% of the thickness of the polypropylene cable protective layer; the thickness of the buffer layer accounted for 20% of the thickness of the polypropylene cable protective layer; the dielectric layer was obtained by the wrapping of a polypropylene film A, and the buffer layer was obtained by the wrapping of a polypropylene film B, and the insulating layer was obtained by the wrapping of a polypropylene film C;

the polypropylene film A comprised the following components in parts by weight: 100 parts of polypropylene, 10 parts of graphene oxide and 1 part of maleic anhydride grafted polypropylene, and the thickness of the polypropylene film A was 0.1 mm;

the polypropylene film B comprised the following components in parts by weight: 100 parts of polypropylene, 5 parts of graphene oxide and 1 part of maleic anhydride grafted polypropylene, and the thickness of the polypropylene film B was 0.1 mm;

the polypropylene film C comprised the following components in parts by weight: 100 parts of polypropylene and 1 part of maleic anhydride grafted polypropylene, and the thickness of the polypropylene film C was 0.1 mm.

The preparation method of the polypropylene cable protective layer of the present embodiment comprised the following steps:

(1) the polypropylene film A was wrapped on the metal conductor cable to obtain a dielectric layer;

(2) the polypropylene film B was wrapped along the dielectric layer to obtain a buffer layer;

(3) the polypropylene film C was wrapped along the buffer layer to obtain an insulating layer;

(4) hot pressing forming was performed at 170° C., the hot pressing direction of hot pressing forming included several hot pressing directions that were centrosymmetric and perpendicular to the circumference of the polypropylene cable protective layer, and the pressure of several hot pressing directions was equal; a step-by-step pressurization method was adopted in the hot pressing forming; the step-by-step pressurization method in the hot pressing forming comprised the following steps: the temperature of the polypropylene cable protective layer was maintained at 160~180° C.;

(a) it was applied pressure at 5 MPa for 2 min;

(b) it was removed pressure and stood for 20 s;

(c) it was applied pressure at 10 MPa for 2 min;

(d) it was removed pressure and stood for 20 s;

(e) it was applied pressure at 15 MPa for 20 min;

(f) after removing the pressure, it was cooled to a temperature of 120° C. and stabilized for 60 minutes;

(g) it was slowly cooled to room temperature at a rate of 10° C./min to obtain the polypropylene cable protective layer.

The preparation method of the polypropylene film A comprised the following steps:

(1) polypropylene pellets (PP) with a melt index of 2.2 g/10 min at 200° C. (the test conditions refer to GB/T 3682-2018), graphene oxide (GO), and maleic anhydride grafted polypropylene (PP-g-MAH) were sequentially put into a roller ball mill for ball milling and mixing according to the weight ratio to obtain a polypropylene film mixture;

(2) the polypropylene film mixture was made into a film by a two-roll calender, and the thickness of the prepared film was in the numerical range of 0.1 mm.

The weight content of graphene oxide was adjusted, and the polypropylene film B and the polypropylene film C were prepared with reference to the preparation method of the polypropylene film A.

The relative permittivity of the prepared polypropylene film A was 32.5, the electrical conductivity was $10^{-8}$ S/m, the thermal conductivity was 0.8 W/m·K, the elastic modulus was 0.75 GPa, and the elongation at break was 126%.

The relative permittivity of the prepared polypropylene film B was 11, the electrical conductivity was $10^{-12}$ S/m, the thermal conductivity was 0.5 W/m. K, the elastic modulus was 0.65 GPa, and the elongation at break was 155%.

The relative permittivity of the prepared polypropylene film C was 2.25, the electrical conductivity was $10^{-14}$ S/m, the thermal conductivity was 0.25 W/m·K, the elastic modulus was 0.65 GPa, and the elongation at break was 145%.

Example 2

As a polypropylene cable protective layer of an example of the present invention, this example only differs from Example 1 in that: the thickness of the dielectric layer accounted for 5% of the thickness of the polypropylene cable protective layer; the thickness of the buffer layer accounted for 17% of the thickness of the polypropylene cable protective layer.

Example 3

As a polypropylene cable protective layer of an example of the present invention, this example only differs from Example 1 in that: the thickness of the dielectric layer accounted for 8% of the thickness of the polypropylene cable protective layer; the thickness of the buffer layer accounted for 20% of the thickness of the polypropylene cable protective layer.

Example 4

As a polypropylene cable protective layer of an example of the present invention, this example only differs from Example 1 in that: the thickness of the dielectric layer accounted for 12% of the thickness of the polypropylene cable protective layer; the thickness of the buffer layer accounted for 25% of the thickness of the polypropylene cable protective layer;

Example 5

As a polypropylene cable protective layer of an example of the present invention, this example only differs from Example 1 in that: the thickness of the polypropylene film A was 0.05 mm; the thickness of the polypropylene film B was 0.05 mm; the thickness of the polypropylene film C was 0.05 mm.

Example 6

As a polypropylene cable protective layer of an example of the present invention, this example only differs from Example 1 in that: the thickness of the polypropylene film A was 0.15 mm; the thickness of the polypropylene film B was 0.15 mm; the thickness of the polypropylene film C was 0.15 mm.

Example 7

As a polypropylene cable of an example of the present invention, the cable sequentially included a conductor 1, the polypropylene cable protective layer described in any one of the above examples and an outer insulation screen layer 5 from the inside to the outside. The polypropylene cable protective layer was sequentially composed of a dielectric layer, a buffer layer and an insulating layer from the inside to the outside.

Comparative Example 1

As a polypropylene cable protective layer of an example of the present invention, this comparative example only differs from Example 1 in that: this comparative example did not include the buffer layer, and the polypropylene cable protective layer of this comparative example was obtained by replacing the polypropylene film B in Example 1 with the polypropylene film C.

Comparative Example 2

As a polypropylene cable protective layer of an example of the present invention, this comparative example only differs from Example 1 in that: this comparative example did not include the buffer layer and the dielectric layer, and the polypropylene cable protective layer of this comparative example was obtained by replacing the polypropylene film B and the polypropylene film A in Example 1 with the polypropylene film C.

Performance Test.

The polypropylene cable protective layers of examples 1-6 and comparative examples 1-2 were combined with conductors to form cable samples. The electrical, thermal and mechanical properties of the cable samples were tested. The results are shown in Table 1. The diameter of the center conductor of the cable samples to be tested is, and the thickness of the polypropylene cable protective layer of the cable samples is.

TABLE 1

Properties of the polypropylene cable protective layer

| Sample | Maximum electric field (kV/mm) | Temperature difference between inside and outside (° C.) | Thickness of protective layer (mm) |
|---|---|---|---|
| Example 1 | 1.4 | 33° C. | 31 |
| Example 2 | 1.2 | 31° C. | 30 |
| Example 3 | 1.4 | 30° C. | 32 |
| Example 4 | 1.1 | 32° C. | 31 |
| Example 5 | 1.5 | 32° C. | 33 |
| Example 6 | 1.4 | 34° C. | 32 |
| Comparative example 1 | 1.8 | 37° C. | 38 |
| Comparative example 2 | 2.0 | 39° C. | 41 |

Figure 3:
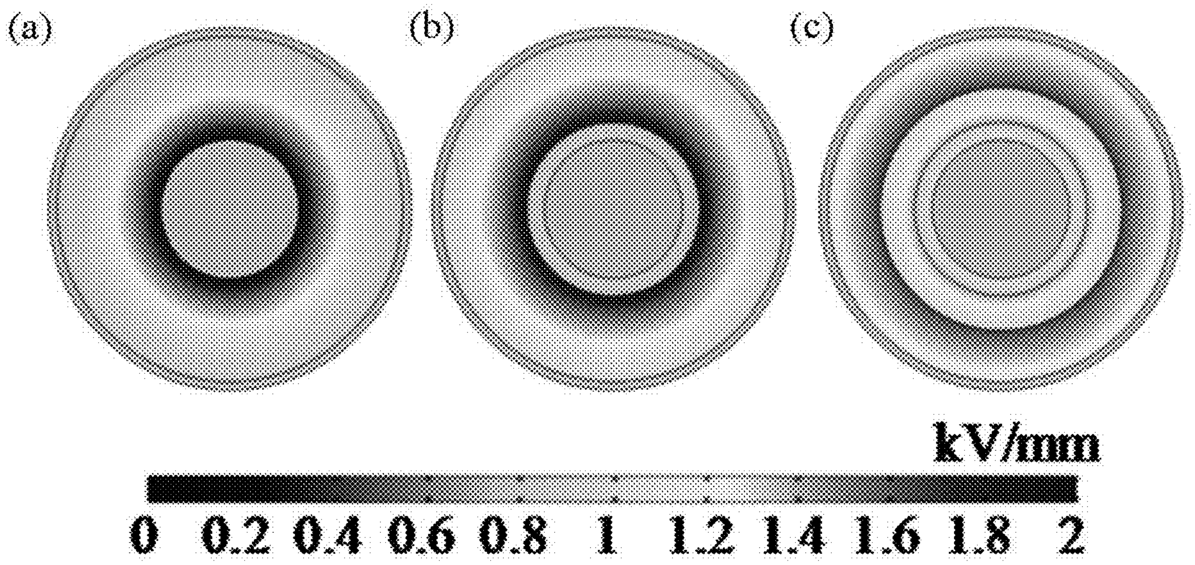
FIG. 3 is a graph showing the test result of the maximum electric field of cable according to an embodiment of the present invention.

The electric field distribution of Example 1, Comparative example 1, and Comparative example 2 is shown in FIG. 3 below. Under the same insulation thickness, when the same voltage is applied to the central conductor, the maximum electric field of Comparative example 2 (FIG. 3*a*) can reach 2 kV/mm, and the maximum electric field of Comparative example 1 (FIG. 3*b*) can still reach 1.8 kV/mm. The uniformity of the electric field in Example 1 (FIG. 3*c*) has been significantly improved, and the maximum electric field is 1.4 kV/mm. The lower insulation internal electric field means that the outer applied voltage level can be higher, indicating that the polypropylene cable protective layer of the examples is beneficial to improving the voltage level of the cable, and it is beneficial to improving the heat dissipation efficiency. Furthermore, the thickness of the protective layer is smaller, and the bending ability of the cable is better.

Finally, it should be noted that the above embodiments are only used to illustrate the technical solutions of the present invention and not to limit the protection scope of the present invention. Although the present invention is described in detail with reference to the preferred embodiments, those of ordinary skill in the art should understand that the technical solutions of the present invention may be modified or equivalently replaced without departing from the essence and scope of the technical solutions of the present invention.

The invention claimed is:

1. A polypropylene cable protection layer, wherein the polypropylene cable protection layer sequentially comprises a dielectric layer, a buffer layer and an insulating layer from the inside to the outside, and the thickness of the dielectric layer accounts for 5%~12% of the thickness of the polypropylene cable protective layer; the thickness of the buffer layer accounts for 17%~25% of the thickness of the polypropylene cable protective layer; the dielectric layer is obtained by the wrapping of a polypropylene film A, and the buffer layer is obtained by the wrapping of a polypropylene film B, and the insulating layer is obtained by the wrapping of a polypropylene film C;

the polypropylene film A comprises the following components in parts by weight: 100 parts of polypropylene, 8~10 parts of graphene oxide and 0.5~5 parts of maleic anhydride grafted polypropylene, and the thickness of the polypropylene film A is 0.05~0.2 mm;

the polypropylene film B comprises the following components in parts by weight: 100 parts of polypropylene, 4~6 parts of graphene oxide and 0.5~5 parts of maleic anhydride grafted polypropylene, and the thickness of the polypropylene film B is 0.05~0.2 mm;

the polypropylene film C comprises the following components in parts by weight: 100 parts of polypropylene and 0.5~5 parts of maleic anhydride grafted polypropylene, and the thickness of the polypropylene film C is 0.05~0.2 mm.

2. The polypropylene cable protective layer according to claim 1, wherein the thickness of the polypropylene film A is 0.08~0.15 mm; the thickness of the polypropylene film B is 0.08~0.15 mm; the thickness of the polypropylene film C is 0.08~0.15 mm.

3. The polypropylene cable protective layer according to claim 1, wherein the thickness of the dielectric layer accounts for 8%~10% of the thickness of the polypropylene cable protective layer; the thickness of the buffer layer accounts for 17%~20% of the thickness of the polypropylene cable protective layer.

4. The polypropylene cable protection layer according to claim 1, wherein the polypropylene cable protection layer is formed by hot pressing at 160° C.~180° C.

5. The polypropylene cable protective layer according to claim 1, wherein the polypropylene film A comprises the following components in parts by weight: 100 parts of polypropylene, 9~10 parts of graphene oxide and 1~5 parts of maleic anhydride grafted polypropylene;

the polypropylene film B comprises the following components in parts by weight: 100 parts of polypropylene, 5~6 parts of graphene oxide and 1~5 parts of maleic anhydride grafted polypropylene;

the polypropylene film C comprises the following components in parts by weight: 100 parts of polypropylene and 1~5 parts of maleic anhydride grafted polypropylene.

6. The polypropylene cable protective layer according to claim 5, wherein the relative permittivity of the polypropylene film A is 30~35, the electrical conductivity is $(0.8\sim1.2)\times10^{-8}$ S/m, and the thermal conductivity is 0.7~0.9 W/m·K;

the relative permittivity of the polypropylene film B is 10~12, the electrical conductivity is $(0.8\sim1.2)10^{-12}$ S/m, and the thermal conductivity is 0.4~0.6 W/m·K;

the relative permittivity of the polypropylene film C is 2.2~2.5, the electrical conductivity is $(0.8\sim1.2)10^{-14}$ S/m, and the thermal conductivity is 0.2~0.3 W/m·K.

7. A cable, wherein the cable sequentially comprises a conductor, the polypropylene cable protective layer according to claim 1 and an outer insulation screen layer from the inside to the outside.

8. A preparation method of the polypropylene cable protective layer according to claim 1, wherein the method comprises the following steps:

(1) wrapping the polypropylene film A as a dielectric layer;

(2) wrapping the polypropylene film B along the dielectric layer to obtain a buffer layer;

(3) wrapping the polypropylene film C along the buffer layer to obtain an insulating layer;

(4) hot pressing forming at 160° C.~180° C., wherein the hot pressing direction of the hot pressing forming includes several hot pressing directions that are centrosymmetric and perpendicular to the circumference of the polypropylene cable protective layer, and the pressure deviation of several hot pressing directions does not exceed 2%.

9. The preparation method of the polypropylene cable protective layer according to claim 8, wherein in the step (4), a step-by-step pressurization method is adopted in the hot pressing forming.

* * * * *